United States Patent
Martin

(10) Patent No.: US 12,040,614 B2
(45) Date of Patent: Jul. 16, 2024

(54) METHOD OF OPERATING A POWER DISTRIBUTION SYSTEM

(71) Applicant: CSEM CENTRE SUISSE D'ELECTRONIQUE ET DE MICROTECHNIQUE SA—RECHERCHE ET DÉVELOPPEMENT, Neuchâtel (CH)

(72) Inventor: William Martin, Founex (CH)

(73) Assignee: CSEM CENTRE SUISSE D'ELECTRONIQUE ET DE MICROTECHNIQUE SA, RECHERCHE ET DEVELOPPEMENT, Neuchâtel (CH)

( * ) Notice: Subject to any disclaimer, the term of this patent is extended or adjusted under 35 U.S.C. 154(b) by 854 days.

(21) Appl. No.: 17/254,549

(22) PCT Filed: Jun. 20, 2019

(86) PCT No.: PCT/EP2019/066338
§ 371 (c)(1),
(2) Date: Dec. 21, 2020

(87) PCT Pub. No.: WO2020/002124
PCT Pub. Date: Jan. 2, 2020

(65) Prior Publication Data
US 2021/0288499 A1    Sep. 16, 2021

(30) Foreign Application Priority Data

Jun. 26, 2018 (EP) .................... 18179730

(51) Int. Cl.
| | |
|---|---|
| *H02J 3/16* | (2006.01) |
| *G05B 13/04* | (2006.01) |
| *H02J 3/38* | (2006.01) |
| *H02J 3/48* | (2006.01) |
| *H02J 3/50* | (2006.01) |

(52) U.S. Cl.
CPC .............. *H02J 3/16* (2013.01); *G05B 13/042* (2013.01); *H02J 3/381* (2013.01); *H02J 3/48* (2013.01);
(Continued)

(58) Field of Classification Search
CPC ...... H02J 3/16; H02J 3/381; H02J 3/48; H02J 3/50; H02J 2203/20; H02J 2300/24;
(Continued)

(56) References Cited

U.S. PATENT DOCUMENTS

| | | | |
|---|---|---|---|
| 2016/0079752 A1* | 3/2016 | Matan ..................... | H02J 13/00 307/24 |
| 2017/0104333 A1* | 4/2017 | Premerlani ............. | H02J 3/381 |
| 2019/0370693 A1* | 12/2019 | Franklin, Jr. .......... | G01W 1/10 |

FOREIGN PATENT DOCUMENTS

| | | |
|---|---|---|
| CN | 104767221 | 6/2017 |
| CN | 105226675 | 2/2018 |

(Continued)

OTHER PUBLICATIONS

Bayindir et al. "An intelligent power factor corrector for power system using artificial neural networks", 2009, Electric Power Systems Research, vol. 79, Issue 1 (Year: 2009).*

(Continued)

*Primary Examiner* — Rehana Perveen
*Assistant Examiner* — Troy A Maust
(74) *Attorney, Agent, or Firm* — DUANE MORRIS LLP; Gregory M. Lefkowitz

(57) ABSTRACT

The invention relates to a method of operating a node of a power distribution system in an optimised manner so as to minimise transmission losses on an external power bus. A power generator feeds in electrical energy via an inverter capable of carrying out Volt/VAR control under the command of an optimiser associated with a supervised learning model such as a support vector machine.

(Continued)

This optimisation takes place in two distinct training phases, one in which the supervised learning model is trained, another in which optimal control parameters for the inverter are obtained.

9 Claims, 4 Drawing Sheets

(52) U.S. Cl.
CPC .............. *H02J 3/50* (2013.01); *H02J 2203/20* (2020.01); *H02J 2300/24* (2020.01); *H02J 2300/28* (2020.01)

(58) Field of Classification Search
CPC .............. H02J 2300/28; G05B 13/042; Y02B 70/3225; Y02E 10/56; Y02E 40/30; Y02E 40/70; Y02E 60/00; Y04S 10/50; Y04S 20/222; Y04S 40/20
See application file for complete search history.

(56) References Cited

FOREIGN PATENT DOCUMENTS

| CN | 105406488 | 8/2018 | |
|---|---|---|---|
| WO | WO-2014075970 A2 * | 5/2014 | ................ H02J 3/16 |
| WO | 2016023579 | 2/2016 | |

OTHER PUBLICATIONS

Garg, Aditie, "Designing Reactive Power Control Rules for Smart Inverters using Machine Learning", May 1, 2018 (Year: 2018).*
Xue et al. "Reactive Power and AC Voltage Control of LCC HVDC System With Controllable Capacitors", IEEE Transactions on Power Systems, vol. 32, No. 1, Jan. 2017 (Year: 2017).*
Cagnano et al. "Online Optimal Reactive Power Control Strategy of PV Inverters", IEEE Transactions on Industrial Electronics, vol. 58, No. 10, Oct. 2011 (Year: 2011).*
Farivar, M., et al., "Optimal Inverter VAR Control in Distribution Systems with High PV Penetration," 2012 IEEE Power and Energy Society General Meeting, San Diego, CA, 2012, pp. 1-7.
Marggraf, O., et al.,"U-Control—Recommendations for Distributed and Automated Voltage Control in Current and Future Distribution Grids," Conference Paper; Conference: 7th Solar Integration Workshop, Berlin, Nov. 2017.
Hempel, S., et al.,"Smart Network Control with Coordinated PV Infeed," 7th Solar Integration Workshop, Berlin, Germany, Oct. 24-25, 2017.
Oudalov, A., et al.,"Voltage Sensitivity—based Reactive Power Control Strategy for Managing High Shares of PV Systems in LV Distribution Grids," 7th Solar Integration Workshop, Berlin, Germany, Oct. 24-25, 2017.
A. Cagnano, E. De Tuglie, M. Liserre and R. A. Mastromauro, "Online Optimal Reactive Power Control Strategy of PV Inverters," in IEEE Transactions on Industrial Electronics, vol. 58, No. 10, pp. 4549-4558, Oct. 2011, doi: 10.1109/TIE.2011.2116757.

* cited by examiner

METHOD OF OPERATING A POWER DISTRIBUTION SYSTEM

CROSS-REFERENCE TO RELATED APPLICATIONS

This application is a § 371 national stage entry of International Application No. PCT/EP2019/066338, filed Jun. 20, 2019, which claims priority to European Patent Application No. 18179730.9, filed Jun. 26, 2018, the entire contents of which are incorporated herein by reference.

The project leading to this application has received funding from the European Union's Horizon 2020 research and innovation programme under grant agreement No 731211.

TECHNICAL FIELD

The present invention relates to the technical field of power distribution systems. More particularly, it relates to a method for operating a power distribution system incorporating local power generation such as a photovoltaic system.

STATE OF THE ART

Currently there is a lot of interest in distributed electricity generation, particularly consumer-owned and operated photovoltaic (PV) modules mounted on buildings.

In many countries, such consumers have the right, and are often even actively encouraged by financial incentives, to feed surplus electrical power generated by their PV modules into the electrical distribution grid. However, legacy electrical grids have been constructed on the basis of a presumption of one-way power flows from large, centralised power plants (hydroelectric, coal, nuclear, wind and so on), down to individual consumers. Such grids comprise multiple distribution levels, each more branched and at a lower voltage as they approach the end consumers. Transformers form the interface between each level.

With relatively few end users feeding surplus electrical energy back into the grid, no special measures are needed. However, as penetration of PV, small-scale wind generation and so on increases, in times of excess production, significant reverse power flows can occur, and line losses can become significant. Indeed, it has been proposed to upgrade the physical transmission lines to render them sufficiently robust as to be able to handle these increased power flows, but this is very expensive and is not an optimal solution. In any case, national and international standards such as EN 50160 place strict limits on power quality, impose voltage variations of only +/−5% of nominal utility voltage (although infrequent and brief transients are permitted up to +/−10%).

Since locally-generated PV is produced as a DC current, an inverter is required to use this energy on an AC network, and/or to be able to feed it back into the wider grid. Modern inverters are capable of injecting power at a given power factor between −1 and 1 rather than simply as active power at unity power factor. By modifying the power factor, an inverter can inject or absorb reactive power (Q), with the result that the voltage at the point of connection between the inverter and the outside network can be manipulated to a certain degree in order to attempt to stay within the applicable standard.

However, determining the inverter parameters necessary to correctly compensate for variations in line voltage and thereby to inject or absorb the correct amount of reactive power while avoiding a significant increase in reactive losses is not trivial. S. Hempel, J.-D. Schmidt, Tröster Eckehard, and T. Ackermann, 'Smart Network Control with Coordinated PV Infeed', 7th International Solar Integration Workshop, Berlin, Germany, pp. 143-148, 24 Oct. 2017, describes a method applicable to almost any inverter and is capable of parametrizing the Q(U) (i.e. reactive power as a function of measured voltage) characteristics of inverter controllers in dependence of the maximum measured voltage at their connection point. This method is capable of identifying the location of inverters in the grid and is able to adjust itself according to a change in the distribution grid, while running autonomously. The main disadvantage of this method is the dependence of the reactive power provision on the maximum measured voltage, which can take months to identify. For instance, if the system is installed in the late summer or early autumn, the maximum PV generation will occur in high summer, almost an entire year later. This means reactive load compensation is coupled to the amplitude of PV generation, which could result in over-injection of reactive power and thus added losses.

F. de Nigris, 'Voltage Sensitivity-based Reactive Power Control Strategy for Managing High Shares of PV Systems in LV Distribution Grids', 7th International Solar Integration Workshop, Berlin, Germany, pp. 229-236,25 Ooctober-2017, suggests assigning a reactive power control characteristic to each PV system by exploiting the information contained in a voltage sensitivity matrix. This method does a local approximation of the global sensitivity matrix of the network in order for each inverter to autonomously regulate the voltage without considering the contribution from other inverters. However, this method is not capable of taking into account what is happening elsewhere in the grid nor the additional reactive losses due to the absorption of reactive power and and is hence not optimal, and as a result the losses are still unacceptable.

A. Cagnano, E. D. Tuglie, M. Liserre, and R. A. Mastromauro, 'Online Optimal Reactive Power Control Strategy of PV Inverters', IEEE Trans. Ind. Electron., vol. 58, no. 10, pp. 4549-4558, October 2011 describes a method to dynamically assign an optimal value for the reactive power output of inverters using a network model and executing load flows. This method requires measurements at the substation transformer and requires modelling of the entire distribution network, which is not only complicated in terms of infrastructure, but extremely costly to build the network model. Furthermore, all the parameters of the real network, such as line impedance, line length, grid topology etc. may not be sufficiently well known to build such a complex model, and any errors in the model will cause errors in the inverter control.

An object of the present invention is thus to propose a method of operating such a power distribution system in which the above-mentioned disadvantages are at least partially overcome.

DISCLOSURE OF THE INVENTION

More specifically, the invention relates to a method of operating at least one node of a power distribution system, this power distribution system comprising a power distribution bus which typically extends from a substation, said node being connected to said power distribution bus and comprising:

at least one local power generator such as a PV array, wind turbine or similar, connected to the power distribution system's power distribution bus (also known as a "feeder") at a respective connection point via a respective inverter adapted to convert DC power from the generator to AC power, said inverter having a power factor able to be predetermined by means of a local or remote controller, i.e. being capable of Volt/VAr control, said inverter having a voltage/reactive power transfer function determined by said controller on the basis of a plurality of control parameters. It should be noted that both the inverter and controller are part of the node, irrespective of whether the controller is physically local thereto or remote, since it is functionally part thereof;

a plurality of sensors arranged to provide timestamped measurements of at least the voltage, active power and reactive power at said connection point. These sensors may for instance be provided in a smart meter connected appropriately;

an emulator adapted to emulate the behaviour of said inverter and said controller (insofar as it controls the transfer function of the inverter) so as output a value of emulated reactive power on the basis of an input value of said voltage, said emulator emulating said transfer function (i.e. providing an emulated output based on the same parameters as the controller uses);

a supervised learning model such as a support vector machine (SVM) or any other type; and an optimiser arranged to output said control parameters for said controller and to determine their optimum values.

The method of the invention comprises a first training phase in which:

a first training dataset is obtained, comprising timestamped measurements of said voltage, said active power and said reactive power at said connection point obtained at a plurality of different times under a predetermined initialisation set of control parameters provided to said controller. This predetermined initialisation set may be for instance parameters generating unity power factor at the invertor, or (quasi-) random transfer functions, so as to be able to observe and measure the response to these various transfer functions. While the first training dataset is being obtained, the system is operating sub-optimally;

said supervised learning model is trained on the basis of the measurements making up the first training dataset so as to determine a relationship between, on the one hand, measured reactive power and measured active power, and on the other hand, measured voltage at said connection point.

The method also comprises a second training phase, in which:

a second training dataset is obtained, comprising further measurements of said voltage, said active power and said reactive power at said connection point obtained at a plurality of different timestamps under non-optimised control parameters, during which time the system is operating but not in an optimal fashion, for instance with the inverter operating at unity power factor, i.e. no Volt/VAR control;

said further measurements of voltage are input to said emulator so as to generate an emulated reactive power value on the basis of said predefined control parameters supplied by said optimiser. The sum of said emulated reactive power value and said measurements of reactive power is input as a first input to said supervised learning model, and said measured active power is input as a second input to said supervised learning model. The supervised learning model (e.g. the SVM) outputs, on the basis of these inputs, a simulated voltage value which is input to said optimiser together with the same sum of said modelled reactive power and the measurements of reactive power. The optimiser then applies a gradient-free optimisation so as to iteratively determine optimised control parameters.

Subsequently, in an optimised operating mode, said optimised control parameters determined in said second training phase are fed to said controller so as to determine the transfer function of said inverter on the basis thereof, and thereby to convert power from said local power generator to AC power at a power factor determined by said controller based on said transfer function and the currently-measured voltage at the connection point, as measured by the sensors/smart meter.

As a result, the control parameters for optimised operation, and hence the VoltNAr transfer function of the controller and inverter can be optimised for one or more inverters on the basis of relatively short-term measurements, without a priori knowledge of the rest of the power distribution system.

Advantageously, in said first training phase, said measurements of measurements of said voltage, said active power and said reactive power at said connection point are obtained at a plurality of times with the power factor of said inverter set to a value of 1, i.e. all active power, no reactive power. This provides an initial training dataset, and enables the system to "learn" the relationship between voltage, active power and reactive power on the bus without attempting to influence it at this stage.

Advantageously, in said first training phase, said measurements of measurements of said voltage, said active power and said reactive power at said connection point are obtained at a plurality of times with said transfer function set arbitrarily. While this can be carried out for initial training of the system, this is particularly interesting subsequent to carrying out a training phase with the inverter's power factor set to unity.

Advantageously, said optimiser applies a Nelder-Mead method, a Cobyla optimisation, a genetic algorithm, a particle swarm optimisation, or a Powell optimisation.

Advantageously, said optimised control parameters are determined for a plurality of said inverters simultaneously. This is possible if the controllers can communicate with one another or with a central controller, and enables optimisation of all the inverters in question irrespective of the layout of the network.

Advantageously, wherein further measurements are taken during said optimised operating mode and are used to further optimise said optimised control parameters by the same method. This enables further optimisation of the control parameters, and rapid adaptation to any changes happening in the network (additions, switching, disconnections, etc).

Advantageously, said optimised control parameters are determined in said second training phase by minimising a cost function, said cost function being:

$$\min C(x, \lambda) = \frac{\lambda V^2(x) + (1-\lambda)L^2(x)}{V(x) + L(x)}$$

where x is a value evaluated during the optimization process, and $\lambda$ is a weighting factor between 0 and 1, V is defined as:

$$V(x) = \sum_{n=1}^{N} \sqrt{\frac{1}{K} \sum_{k=1}^{K} (10u_{k,n}(x) - 10)^2}$$

and L is defined as:

$$L(x) = \sum_{n=1}^{N} \frac{\sqrt{\frac{1}{K} \sum_{k=1}^{K} Q_{k,n}(x)^2}}{(\max Q_n - \min Q_n)}$$

where K is the number of timestamps of said second training dataset, N is the total number of inverters 17, u is the predicted voltage provided by said supervised learning model and Q is the sum of the reactive powers from the measurements of reactive power and emulated reactive power, k denotes the timestamp of the measurement and n denotes the inverter in question.

However, other cost functions are possible, and can incorporate any useful metric such as feed-in tariff information, or any other useful metric.

Advantageously, said optimisation is carried out for a plurality of values of A, optimal values of V(x) and L(x) are recorded and a Pareto front is calculated, said optimum parameter values being selected on the basis of said Pareto front.

The invention further relates to a power distribution system comprising a local distribution bus extending from a substation and at least one node, said node comprising
  a connection point with said bus;
  optionally, a local power consumer connected to said connection point;
  a plurality of sensors (e.g. in a smart meter) adapted to measure voltage on said bus, active power flow and reactive power flow at said connection point;
  a local power generator connected via an inverter to said connection point, said inverter being adapted to carry out Volt/VAr control under the control of a local or remote controller adapted to carry out the method of any preceding claim. In this specific case, said controller naturally contains and implements the supervised learning model, the emulator and the optimiser described above.

BRIEF DESCRIPTION OF THE DRAWINGS

Further details of the invention will appear more clearly upon reading the description below, in connection with the following figures which illustrate.

EMBODIMENTS OF THE INVENTION

Figure 1:
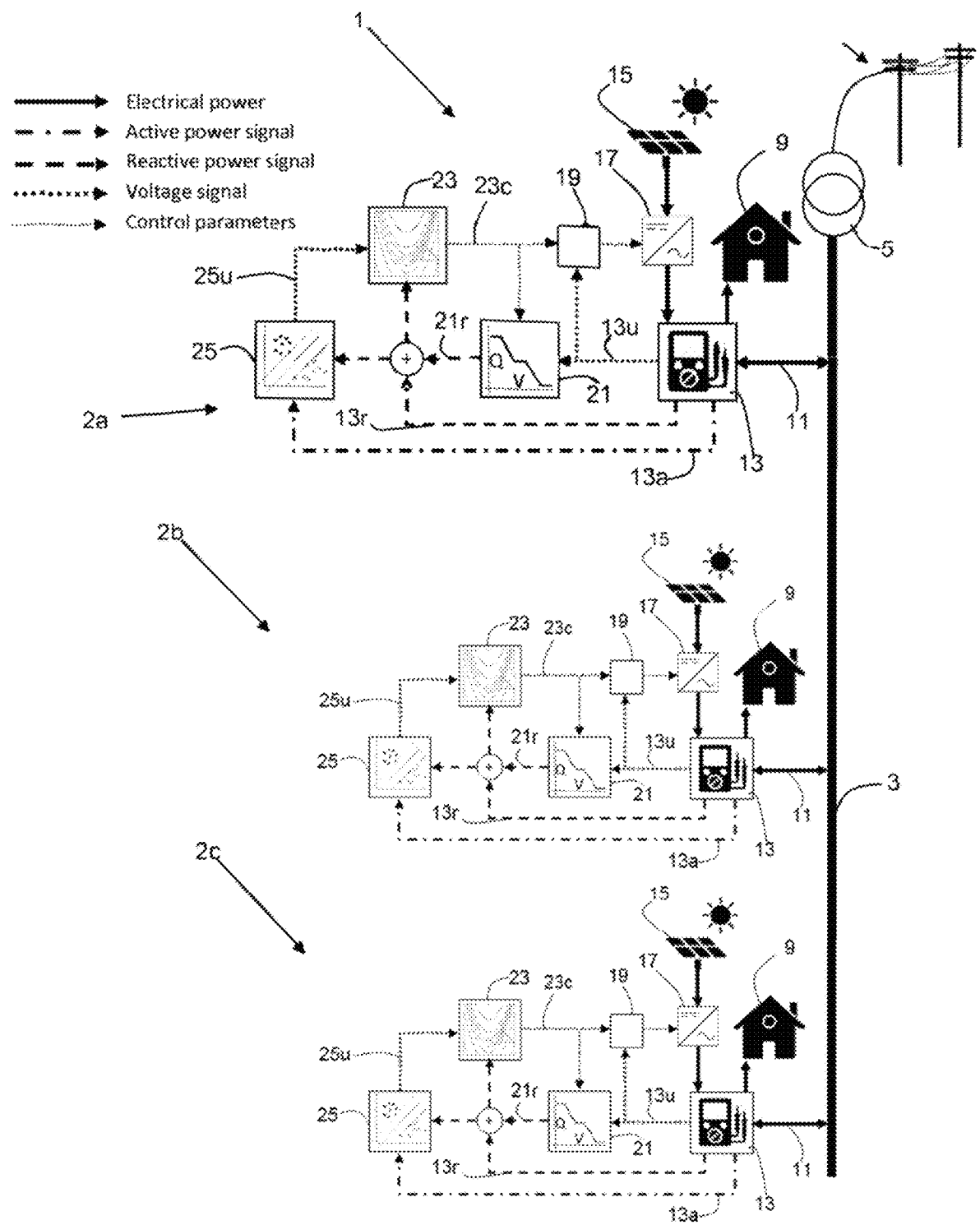
FIG. 1: an energy distribution system according to the invention.

FIG. 1 illustrates a power distribution system 1 in connection with which the method of operation of the invention can be used.

The power distribution system 1 comprises a local power distribution bus 3 extending from a substation 5 which is the interface between the bus 3 and the next level of power distribution, such as a wide area power supply grid 7, and serves to step the voltage of this latter down. The bus may extend linearly or in a branched configuration from the substation 5, and operates at a utility voltage which may be, for instance, 220V, 400V, 3 kV or any other appropriate voltage.

As illustrated, the system comprises three nodes 2a, 2b, 2c, although any number of nodes from 1 upwards can be provided. Each node 2a, 2b, 2c comprises an energy consumer 9, a local power source, i.e. a local power generator 15, and a connection point 11 with the bus 3, also referred to as a "point of common coupling (PCC)". It should also be noted that the consumer 9 is optional, and in its absence the node 2a of the system 1 is adapted only to supply energy to the bus 3 and not to take energy from it.

Each energy consumer 9 is represented by a house symbol implying a domestic consumer but this could also be a commercial or industrial consumer (if present). This consumer 9 is connected to the bus 3 at the PCC 11, and a plurality of sensors are provided in a so-called "smart meter" 13, which, in the present context, can measure the voltage at the PCC 11, the active power flow P, the reactive power flow Q, and any other convenient electrical parameters. Although the smart meter 13 is discussed in the foregoing, the plurality of sensors may simply be dedicated sensors connected to the various conductors at or around the connecting point 11.

The local power generator 15, such as a PV array or alternatively a wind turbine, combined heat and power (CHP) system, or similar, feeds generated power (typically direct current DC power) into an inverter 17 so as to generate alternating current AC power. This AC power is distributed to one or both of the energy consumer 9 and the bus 3 under the control of the smart meter 13, depending on the consumption of the consumer 9 at any given moment.

The inverter 17 is part of the corresponding node 2a, 2b, 2c and is of the type capable of performing so-called Volt/VAr control, i.e. one which has a power factor which can be determined at will by varying the proportion of power which is delivered as active power and as reactive power. Normally, an inverter will work at unity power factor, i.e. 100% of the power output being active power, and 0% being reactive power. By varying the power factor, reactive power can be output when the inverter is overexcited, and reactive power can be absorbed when the inverter is underexcited, which can then compensate for voltage rises and supply an appropriate amount of reactive power to counteract an imbalance of reactive power on the bus 3. This is controlled by a controller 19, which is at least functionally part of the corresponding node 2a, 2b, 2c and will be described in more detail below.

Figure 2:
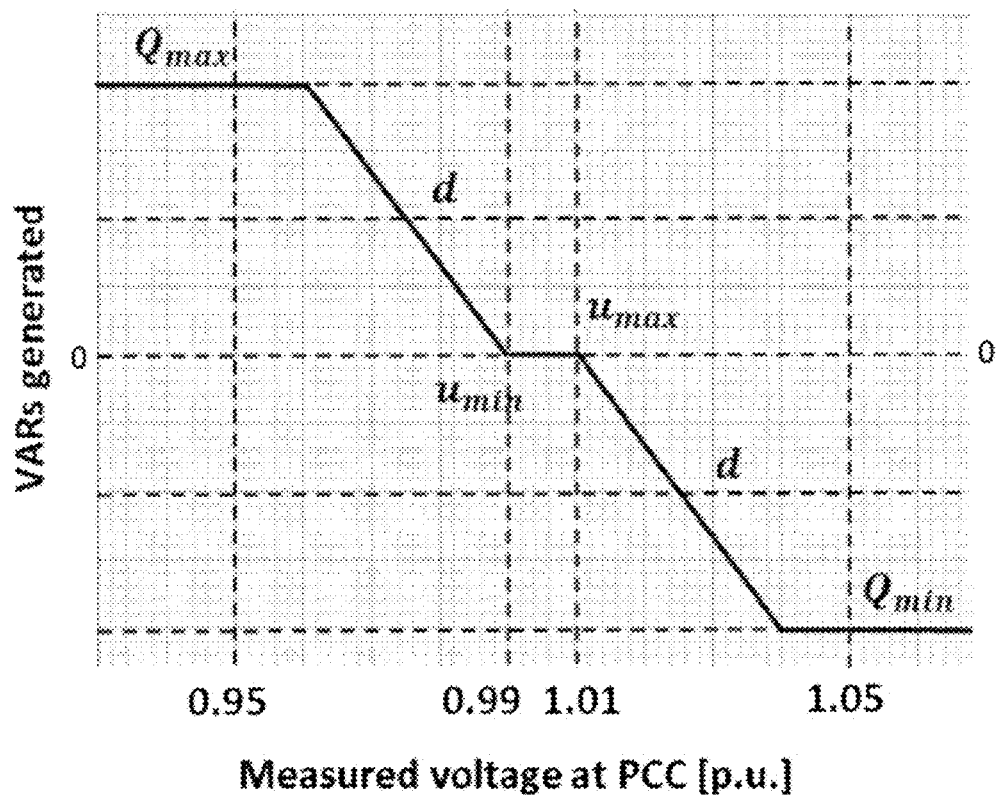
FIG. 2: an example transfer function for an inverter.

The principle of VoltNAr control of the inverter 17 is illustrated in FIG. 2, which shows a graph of measured voltage at the PCC 11 along the horizontal axis and normalised to the nominal bus voltage (where 1.0 is the normalised desired nominal bus voltage) and reactive power (VAr) output by the inverter along the vertical axis. This graph represents a typical transfer function used by controller 19 in order to cause it to output reactive power Q to the bus 3 in function of the measured voltage u at the PCC 11. It should be noted that the controller 19 has been illustrated as a separate functional block in FIG. 1, however it is typically integrated into the inverter 17 itself, and the controller, whether implemented in the inverter, in another unit or remotely, may also comprise an emulator, SVM and optimiser (see below). In other words, all these functional blocks (emulator, SVM, optimiser) may be implemented in the controller 19, entirely separately in different units, or combined in any combination in any convenient number of units. The controller 19 comprises a programmable microprocessor, or may simply be provided as a software program in a general-purpose computer. It may be local to the inverter 17, or situated remotely thereto and in communication therewith by means of a communication network (such as an internet connection, not illustrated). In the case of multiple inverters 17 in multiple nodes 2a, 2b, 2c, . . . , of the system, these may either each be standalone, or may be in communication via such a communication network such that all inverters in the system 1 can be optimised together.

The parameters of the transfer function of this model of the inverter controller are as follows:

$u_{max}$, $u_{min}$—maximum and minimum measured voltages for which no reactive power is generated by the inverter 17. This range is known as the "voltage deadband" in which no intervention in the reactive power balance is carried out, i.e. no reactive power is generated, only active power.

$Q_{max}$, $Q_{min}$—maximum and minimum reactive power that the inverter 17 can supply or absorb. $Q_{min}$ is a negative value and hence corresponds to the inverter 17 absorbing reactive power. If the input voltage is higher or lower than the inflexion point corresponding to $Q_{max}$ or $Q_{min}$, then the reactive power generated is respectively $Q_{max}$ or $Q_{min}$.

d—the so-called "droop parameter", which corresponds to the slope of the transfer function between $Q_{max}$ and the corresponding limit of the voltage deadband on the one hand, and $Q_{min}$ and the other limit of the voltage deadband on the other hand.

Hence, If the voltage input is below the lower deadband, then the output reactive power becomes:

$$Q_{out}=100*(u_{min}-u_{in})*S_{nom}/d$$

where $S_{nom}$ is the nominal rating of the inverter 17 and may, for instance, be equal to $Q_{max}$ and $-Q_{min}$, however this does not have to be the case.

Likewise, if the voltage input is above the upper deadband, then the output reactive power becomes:

$$Q_{out}=100*(u_{max}-u_{in})*S_{nom}/d$$

In these equations, lowercase $u_{in}$ denotes the voltage fed into the inverter in per unit (p.u.), which is the actual voltage divided by the nominal voltage rating of the bus 3.

It should be noted that other transfer functions are possible, whether linear or not, and that the slope of the function either side of the voltage deadband does not have to be the same. Similarly, the maximum and minimum reactive power ($Q_{max}$ and $Q_{min}$) the inverter can supply or absorb and/or the voltage deadband need not be symmetrical.

The core of the invention revolves around the determination of the transfer function of the inverter 17, notably by means of determining its parameters as 25 described above (or as appropriate) in order to minimise power transmission losses and voltage rises on the local transmission bus 3. This is initially carried out in a second training phase (see below).

To this end, the system comprises an emulator 21, which models the inverter 17 and its controller 19. Since only these elements are modelled, the model is simple and simulates known properties, unlike the prior art methodologies which may require modelling aspects of the bus 3 such as line length, bus geometry and so on. As inputs, the emulator 21 takes voltage measurements 13u obtained from the smart meter 13, as well as transfer function parameters provided by an optimisation algorithm 23, which will be described in more detail below. The emulator 21 outputs, on the basis of the input voltage measurements and the transfer function parameters, an emulated reactive power signal 21r which should correspond substantially to the reactive power emitted by the inverter 17 under the same control parameters.

The sum of the emulated reactive power signal 21r and the measured reactive power 13r is fed to a supervised learning model 25, such as a support vector machine 25, which outputs predicted PCC voltage values 25u based on its inputs, namely the measured active power 13a, and the sum of emulated reactive power 21r and measured reactive power 13r. In the following text, the supervised learning model 25 is referred to by the specific case where it is a support vector machine 25. However, other supervised learning models are possible, such as linear regression models, logistic regression models, naïve Bayes models, linear discriminant analysis models, neural networks, and so on. The skilled person can adapt the invention as described below to any of these alternative models.

These predicted PCC voltage values 25u are fed to an optimiser 23, together with the sum of emulated reactive power 21r and measured reactive power 13r, and control parameters 23c, which are fed again to the emulator 21 if they do not correspond to an optimum. If the control parameters 23c are deemed to be optimal, they are fed to the controller 19 for controlling the inverter 17, putting the system into an optimised operating mode.

The optimiser 23 carries out a gradient-free optimisation, i.e. an optimisation that does not require knowledge of the derivative of the objective function of the optimisation problem. In other terms, a point at which the derivative of the cost function is zero does not need to be known. A Nelder-Mead optimisation is particularly suitable, and will be described in detail in the following. However, other optimisations such as a Cobyla optimisation, a genetic algorithm, a particle swarm optimisation, or a Powell optimisation can also be used. These optimisations are well documented in the literature and do not need to be described in detail.

Once optimised parameters are obtained, they can be used by the controller 19 to control the inverter 17 in an optimised operating mode so as to generate AC power at the desired power factor. This general principle can be applied to one local power generator 15, but can also be applied to multiple local power generators 15, provided that a data communication network is provided such that each system can communicate.

Furthermore, even in said optimised operating mode, further optimisation can take place on the basis of newly-measured voltage, active power and reactive power measurements.

It should be noted that the emulator 21, SVM 25 and optimiser 23 are typically executed in software, and may be incorporated as sub-units/subroutines in the controller 19 itself or executed by a general-purpose computer (not illustrated) controlling one or more controllers 19. Such a computer may be located locally to the connection point 11 or remote thereto.

A specific embodiment of this optimisation process will now be described in more detail.

In essence, the optimisation is split into two phases: a first training phase, in which the support vector machine (SVM) 25 is trained based on a first training dataset comprising voltage, reactive power and reactive power measurements obtained at the connection point 11, and a second training phase, in which the optimiser 23 optimises the control parameters on the basis of a second, different training dataset. Once the control parameters are optimised, the inverter 19 is operated on the basis of these optimised control parameters so as to convert DC power from the generator 15 to AC power at an optimised power factor.

First, the first training phase will be discussed.

As mentioned above, the support vector machine (SVM) 25 is used to predict the voltage at the PCC 11, given the corresponding active and reactive power and a timestamp containing the hour of the day during which the measurement is taken. SVMs allow to disregard any network models and simulation programs, since they can "learn" how correlated variables react to one another. The predicted voltage is used as a metric to a cost function, defined in Equation 5 below.

SVMs in general are a set of supervised learning methods used for classification, regression and outlier detection and as stated above, other types of supervised learning methods other than SVMs are possible in the context of the present invention. Classifiers such as those provided at www.scikit-learn.org are trained using two input arrays: an array X containing the training samples and an array y of class labels. In the context of this invention, the training samples X comprises:

- Time series of active and reactive power and the timestamp defining the hour during at which the measurements are taken while the inverter is operating at unity power factor (i.e. without Volt/VAr control). The length of these series should ideally be in the order of several days or weeks.
- Time series of active and reactive power and the timestamp consisting of the hour at which the measurements are taken while the inverter is operating with random Q(U) characteristic:
  - Droop d varying randomly between 1 and 50 at every timestep of the measurement;
  - Maximum and minimum reactive power capabilities (respectively $Q_{max}$ and $Q_{min}$) varying randomly and respectively between 0.001 and $S_{nom}$ and −0.001 and −$S_{nom}$.
  - A voltage deadband of $u_{min}$, $u_{max}$=1±0.01. The values for the deadband set for this measurement phase can be reconfigured to lim $u_{min}, u_{max}$=1±α if it is unsure whether the inverter is too near to the substation (or to the beginning of the bus 3). In this case the deadband would ideally also be an optimizable parameter of the Q(U) characteristic The training samples X of a first training dataset are measured during a period of several days or weeks (e.g. up to three weeks), and are stored, with the inverter 19 running suboptimally, on the basis of a predetermined initialisation set of control parameters (see above). For a greater quality of prediction, this period can be extended to the order of months. The class label y comprises the measurements of voltage corresponding exactly to the measurements in the training samples X. Schematically, for a single PV inverter (single node), this gives the following:

The training sample $X$: [Equation 1]

$$\begin{bmatrix} p_0 & q_0 & t_0 \\ p_1 & q_1 & t_1 \\ p_2 & q_2 & t_2 \\ \ldots & \ldots & \ldots \\ p_{K-2} & q_{K-2} & t_{K-2} \\ p_{K-1} & q_{K-1} & t_{K-1} \\ p_K & q_K & t_K \end{bmatrix} \xrightarrow{yields} \text{the class label } y: \begin{bmatrix} u_0 \\ u_1 \\ u_2 \\ \ldots \\ u_{K-2} \\ u_{K-1} \\ u_K \end{bmatrix}$$

K is the total number of measurements (i.e. the number of timestamps) in the first training dataset. The first column of the training sample X corresponds to the active power, the second column to the reactive power and the last column to the timestamp at which the measurements are taken. This last column is important in order to consider the behaviour of consumption which is time-dependent during a day. The single column of the class label y relates to the voltage at the corresponding inverter of the node 2 in question. It is reiterated that the training sample X also contains measurements performed while the inverter is operating at unity power factor and then at random Q(U) characteristics.

For a plurality of inverters situated at different points on the bus 3 (i.e. having a plurality of PCC's 11), the first training dataset X may become the aggregated training samples X of all individual nodes, where I is the total number of inverters involved in the optimisation. Schematically, this would become:

The training sample $X$ for $I$ inverters: [Equation 2]

$$\begin{bmatrix} p_{0,0} & q_{0,0} & \ldots & p_{0,I} & q_{0,I} & t_0 \\ p_{1,0} & q_{1,0} & \ldots & p_{1,I} & q_{1,I} & t_1 \\ p_{2,0} & q_{2,0} & \ldots & p_{2,I} & q_{2,I} & t_2 \\ \ldots & \ldots & \ldots & \ldots & \ldots & \ldots \\ p_{K-2,0} & q_{K-2,0} & \ldots & p_{K-2,I} & q_{K-2,I} & t_{K-2} \\ p_{K-1,0} & q_{K-1,0} & \ldots & p_{K-1,I} & q_{K-1,I} & t_{K-1} \\ p_{K,0} & q_{K,0} & \ldots & p_{K,I} & q_{K,I} & t_K \end{bmatrix}$$

Conditional sentencing can be used and implies that the training sample X can alternatively be that of Equation 2 for each inverter when considering a plurality of inverters (see equation 2). In other words, when multiple nodes 2a, 2b, 2c . . . are present, the individual nodes can be individually optimised, or can be optimised together in a combined fashion. In any case, the class label y remains identical for each inverter. Moreover for any case, a SVM model is created and trained for each inverter given the training sample X chosen and class label y.

Finally, the first training dataset X is scaled in order for individual features to look like normally distributed data. Indeed, if a feature has a variance that is orders of magnitude larger than others, it might dominate the objective function, and this should be avoided.

Subsequently, the SVM hyperparameters are optimised.

By fitting the SVM model according to the given training data and appropriate hyperparameters (see: http://pyml.sourceforge,net/doc/howto.pdf, herein incorporated by reference in its entirety, for an explanation of SVM's, hyperparameters and so on), it is possible to use a non-linear regression to predict a new array $y_{to\ predict}$ (i.e. voltage) given a new array $X_{new\ data}$ not included in the training sample (e.g. measured data of active and reactive power). A subcategory of SVM models used here is the Epsilon-Support Vector Regression (ε-SVR, see: www.scikit-learn.org) which takes as parameters:

C: a penalty parameter of the error term (default=1.0)

Epsilon: ε specifies the epsilon-margin within which no penalty is associated in the training loss function with points predicted within a distance epsilon from the actual value (default=0.1)

Gamma: γ coefficient for certain kernels (default=1/number of features)

Kernel: specifies the kernel type used in the algorithm. In the present example, the radial basis function kernel ($\exp(-\gamma\|x-x'\|^2)$) is used, however other kernel functions can be used, such as linear, polynomial, Gaussian or sigmoid functions.

A ε-SVR solves the following primal problem given training vectors $x_i \in \mathbb{R}^p$, i=1, . . . , n and a vector $y \in \mathbb{R}^n$.

$$\min_{\omega,b,\zeta,\zeta^*} \frac{1}{2}\omega^T\omega + C\sum_{i=1}^{n}(\zeta_i + \zeta_i^*)$$

subject to $y_i - \omega^T\phi(x_i) - b \leq \varepsilon + \zeta_i$, $\omega^T\phi(x_i) + b - y_i \leq \varepsilon + \zeta_i^*$, $\zeta_i, \zeta_i^* \geq 0, i = 1, \ldots, n$ In its dual form:

$$\min_{\alpha,\alpha^*} \frac{1}{2}(\alpha - \alpha^*)^T Q(\alpha - \alpha^*) + \varepsilon e^T(\alpha + \alpha^*) - y^T(\alpha - \alpha^*)$$

subject to $e^T(\alpha - \alpha^*) = 0$ $0 \leq \alpha_i, \alpha_i^* \leq C, i = 1, \ldots, n$ Where e is the vector of all ones, C>0 is the upper bound, Q is an n by n positive semidefinite matrix, $Q_{ij} \equiv K(x_i, x_j) = \Phi(x_i)^T\phi(x_j)$ is the kernel.

The above-mentioned parameters being highly dependent on the application for which SVMs are used (i.e., dependent on the nature of the measurements), the hyperparameters need to be optimally chosen to give best predicted values.

To this end, a grid search method is used to evaluate the prediction performance of the SVM given a set of hyperparameters. Here, a grid is formed by the C and epsilon parameter, which respectively can cover the values [1, 10, 100] and [0.001, 0.01, 0.1, 1] (note that the grid can be formed by any other SVM parameter and any number of parameters in any range). The performance of the SVM is evaluated using the mean squared error scoring. Schematically, the grid search can be represented as follows:

TABLE 1

|  | 1 | 10 | 100 |
| --- | --- | --- | --- |
| 0.001 | × | × | × |
| 0.01 | × | × | × |
| 0.1 | × | × | × |
| 1 | × | × | × | where x corresponds to the score computed at each set of hyperparameters. The set corresponding to the best score is retained and used to model the SVM. Other optimization techniques such as Nelder-Mead (see below), Powell, or Cobyla can also be used to optimise these hyperparameters.

Optionally, the hyperparameter optimisation can be carried out with a Nelder-Mead optimisation, or any other gradient-free optimisation mentioned in the text.

In order to optimise the above-mentioned SVM hyperparameters more efficiently, the Nelder-Mead algorithm can be used in order to optimize the hyperparameters. The Nelder-Mead method is a heuristic optimization technique (i.e. a non-analytical technique) that uses a geometrical shape called a simplex as its 'vehicle' to search the optimization domain for a minimum. This simplex is reshaped and moved one vertex at a time towards an optimal region in the search space. This algorithm may, for instance, be implemented through SciPy.org, an open source optimization module for Python.

In the context of optimizing the hyperparameters of the SVM using a Nelder-Mead algorithm, the simplex of the algorithm comprises the hyperparameters of a support vector regression (SVR), which are C, gamma, and epsilon as described beforehand. Since the Nelder-Mead algorithm is non-constrained, a range is permitted for each hyperparameter. If one of the hyperparameters goes outside its allowable range during the optimization process, a large value for the cost is assigned in the function evaluation. The initial simplex used for the algorithm may be schematically represented by a matrix of 0s and 1s $$\begin{pmatrix} 1 & 0 & 0 \\ 0 & 1 & 0 \\ 0 & 0 & 1 \\ 1 & 1 & 1 \end{pmatrix}$$ [Equation 3]

In this equation, the rows represent the vertices of the simplex (since four points are appropriate to form a tetrahedron in three dimensions, there are correspondingly four rows), and the columns represent the hyperparameters (three in total). 1s represent the maximal allowable value in the range for each respective hyperparameter and 0s represent the minimum allowable value, and the actual values are scaled from their original values into values ranging from 0 to 1. The initial simplex thus starts from the boundaries of the search space. The initial simplex can have a smaller or higher dimension depending on the number of hyperparameters to optimize. In this case, the dimension is 3: the C, gamma, and epsilon parameters of the Epsilon-Support Vector Regression.

The algorithm thus uses this simplex as a vehicle to search for a minimum in the optimization domain by evaluating one vertex at a time and reshaping/moving the simplex towards an optimal vertex consisting of the three hyperparameters. The evaluation of this vertex is computed for the cost function of the algorithm and is determined as follows, step by step:

1. Check if vertex is outside the boundaries of the search space. If yes, set a large value for the cost (root mean square error RMSE) and go straight to step 6. If no, go to step 2.
2. Create an SVM with the hyperparameters represented by the vertex which is currently evaluated.
3. Train the SVM with the training sample X and class label y.
4. Predict the voltage in class label y using the training sample X with the K-fold cross-validation technique, where K is the number of days of available measurements.
5. Compute the RMSE between the prediction and the actual class label y.
6. If the RMSE value is the lowest recorded, the vertex (and thus the hyperparameters) is kept. If not, a new vertex is evaluated, and the process returns to step 1.

By exploring the three-dimensional search space formed by the hyperparameters, Nelder-mead is able to find the best model trained with the optimal hyperparameters. For a plurality of inverters 17, an SVM is trained with optimal hyperparameters for each inverter using either the aggregated training sample X of Equation 2 or its own training sample X of Equation 1.

Irrespective of how the SVM 25 is optimised, cross-validation can be used if desired to minimise the amount of data needed to train the SVM. This technique comprises splitting the first training dataset into n equal slices. The first slice is used as training dataset while the next slice is used as a test set to evaluate the performance of the SVM. Then the second slice is included into the training dataset and the next (third) slice becomes the test set and so on until no more slices are available. This can not only be used for the initial training of the system, but can also be carried out once the trained controller 19 is operating so as to automatically compensate for any changes which might occur on the bus 3 (addition or subtraction of consumers or local power sources, switching, and so on).

Figure 4:
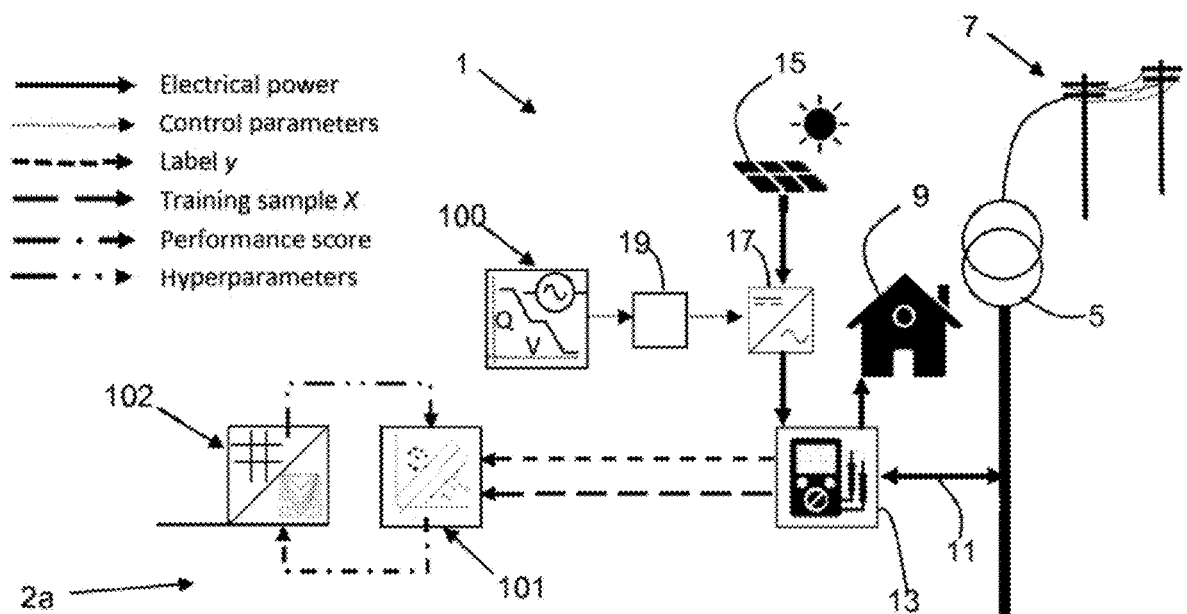
FIG. 4: a schematic diagram of the energy distribution system when operating in a first training phase.

In view of the foregoing, FIG. 4 illustrates more generally and schematically how the node 2a operates during this first training phase. Transfer function generator 100, periodically sends control parameters to controller 19. Transfer function generator 100 may be implemented in the controller 19 itself, or elsewhere. As described above, the control parameters set the inverter 17 initially to unity power factor for a certain period and the resulting measurements from smart meter 13 are saved. Subsequently, random Q(U) characteristics are generated by transfer function generator 100 and sent to the inverter periodically, and the resulting measurement from smart meter 13 are once again stored as discussed above. All the data measured is considered as the first training dataset in the sense of the invention. This first training dataset is then fed to the untrained SVM 101 (label y and training sample X). Using this data, the SVM 101 is trained according to the description of the epsilon-SVR above, applying the above-mentioned methods of optimizing the hyperparameters and minimizing data needed to train the SVM. For the optimization of the SVR 25, a set of hyperparameters is used to model the SVR and a scoring is computed to assess the performance of the model (using said set of hyperparameters). This scoring is sent back again to a selected method (grid search or Nelder-Mead), which outputs a new set of hyperparameters and so on until the best score is obtained.

A description of the second training phase now follows, in which the optimiser 23 finds optimised control parameters, on the basis of a second training dataset which is different to the first training dataset, this second training dataset being obtained with inverter control parameters set so that the inverter 17 operates at unity power factor (i.e. 100% active power), or with any other known transfer function.

In order to find the optimised Volt/VAr control parameters of FIG. 2 for a single inverter 17, or simultaneously for a plurality of inverters 17 each situated at an individual node 2, 2a, 2b . . . of the system 1 and connected to a communication network, the Nelder-Mead algorithm is used in the same context as for the optimization of the hyperparameters of the SVM as described above. Although Nelder-Mead is described in detail below, other gradient-free optimisations as are known to the skilled person can also be used.

In the case of Nelder-Mead, here, the simplex relates to the optimizable static parameters of the controller 19, which happen to be parameters of the model of the Volt/VAr controller as discussed above in the context of FIG. 2. The algorithm thus uses this simplex as a vehicle to search a minimum in the optimization domain by evaluating one vertex at a time and reshaping/moving the simplex towards an optimal vertex relating to the Volt/VAr parameters. Depending on the number of inverters included in the optimization process and the number of parameters to optimize, the simplex will be n-dimensional with n+1 vertices.

Since the Nelder-Mead method is unconstrained, each parameter (or coordinate of the vertex) is allowed within a certain range. The initial simplex is set as follows:

$$\begin{pmatrix} 1 & 0 & 0 & \ldots & \ldots & \ldots & \ldots \\ 0 & 1 & 0 & \ldots & \ldots & \ldots & \ldots \\ 0 & 0 & 1 & \ldots & \ldots & \ldots & \ldots \\ \ldots & \ldots & \ldots & \ldots & \ldots & \ldots & \ldots \\ \ldots & \ldots & \ldots & \ldots & 1 & 0 & 0 \\ \ldots & \ldots & \ldots & \ldots & 0 & 1 & 0 \\ \ldots & \ldots & \ldots & \ldots & 0 & 0 & 1 \\ 1 & 1 & 1 & \ldots & 1 & 1 & 1 \end{pmatrix} \quad \text{[Equation 4]}$$

In this matrix, the rows represent the vertices of the simplex and the columns contain all parameters of all inverters 17 involved. 1s represent the maximum allowable value in the range for each respective control parameter and 0s represent the minimum allowable value. The matrix of equation 4 basically comprises in an identity matrix followed by a row of ones. This was chosen in order for the vectors spanned by any combination of rows (vertices) to form a linearly dependent system (achieved for the simplex describing all inverters and for the sub-simplices corresponding to individual inverters in the system). For example, if 4 inverters are included in the algorithm and each inverter has 3 parameters to be optimized, then the simplex will comprise 13 vertices (rows) and 12 columns (parameters). Thus, the configuration of the initial simplex of Equation 4 allows for the initial simplex corresponding to each individual inverter to span in three dimensions (three parameters), thus creating a virtual tetrahedron. This is achieved not only for each inverter but for the system as a whole.

The algorithm thus uses this simplex as a vehicle to search for minimum in the optimization domain by evaluating one vertex at a time and reshaping/moving the simplex towards an optimal vertex whose coordinates comprise the control parameters. The evaluation of a vertex is computed by the cost function of the algorithm, which is the following:

$$\min C(x, \lambda) = \frac{\lambda V^2(x) + (1-\lambda)L^2(x)}{V(x) + L(x)} \quad \text{[Equation 5]}$$

where x is the vertex evaluated during the optimization process, and $\lambda$ a weighting factor between 0 and 1. V and L are defined as follows:

$$V(x) = \sum_{n=1}^{N} \sqrt{\frac{1}{K}\sum_{k=1}^{K}(10 u_{k,n}(x) - 10)^2} \quad \text{[Equation 6]}$$

$$L(x) = \sum_{n=1}^{N} \frac{\sqrt{\frac{1}{K}\sum_{k=1}^{K} Q_{k,n}(x)^2}}{(\max Q_n - \min Q_n)} \quad \text{[Equation 7]}$$

where K is the length of the newly-measured data described more in detail below, i.e. the number of timestamps. N is the total number of nodes or inverters 17 included in the optimization algorithm. u is the predicted voltage provided by the SVM (see above) and Q is the sum of the reactive powers from the emulated controller model (see above in the context of FIG. 2) and the newly measured data. Lowercase k and n simply denote the timestamp and inverter number.

Thus, the cost function for the Nelder-Mead method sums up the normalized entries of voltage and reactive power across all monitored nodes in the system and throughout the entire time range of the new measurements (note that monitored nodes do not necessarily only need to be nodes at which inverters are installed but can also be any other measurable node in the grid, for example at the beginning of the feeder/bus 3 where the substation 5 is located). By doing so, the cost function is able to minimize the voltage deviation caused by PV production and minimize the losses of reactive power caused by injecting power to compensate the local consumption of reactive power.

The full algorithm for the second training phase hence operates as follows:

1. Measurements of voltage, active power, and reactive power are obtained with the inverter 17 operating at unity power factor (no Volt/VAr control). The measuring campaign here need not be long (a day or two is typically enough), and these measurements constitute a second training dataset. This is carried out by smart meter 13 of FIG. 1.
2. With the optimisation algorithm in block 23 of FIG. 1, check if vertex is outside the boundaries of the search space. This is equivalent to checking if any control parameter is outside a defined range. If yes, set a large value for the cost and go to step 7. If not, go to step 3.
3. Then, the measured voltage taken from the second training dataset (as measured by the smart meter 13) is fed into the emulator 21, which contains, as a reminder, a model of the controller 19 and inverter 17. The emulated reactive power is computed for each node (given the appropriate voltage at that node) where an inverter is located.
4. The reactive power previously measured by the smart meter 13 in step 1 is summed with the emulated reactive power from step 3.
5. The SVM 25, which has previously been trained and fitted for each inverter in the first training phase is supplied with the newly-measured active power and the summed reactive power from step 4.
6. The predicted voltage from step 5 and the added reactive power from step 4 are used to evaluate the cost function (equation 5).
7. If the cost is the lowest recorded, the current vertex is kept and the optimization ends here. The vertex thus contains information on the optimal parameters for each inverter. It the cost is not the lowest, a new simplex is reshaped/moved by creating a new vertex (Nelder-Mead or similar algorithm). This vertex is then evaluated by going back to step 2.
8. Step 2 through 7 are repeated for a range of possible values of 2L where the optimal values of V(x) and L(x) are recorded to draw a Pareto front. From this Pareto front, a Pareto optimum is automatically selected (see below).

Equation 5 contains a weighting factor A which can be set either to a) fully correct the voltage (in which case $\lambda=1$), to fully minimise the reactive losses (in which case $\lambda=0$), or at an intermediate value to optimise the trade-off between voltage correction and minimisation of reactive losses. This can be set arbitrarily based on an informed choice (e.g. 0.5), or advantageously can be determined as described below.

Figure 3:
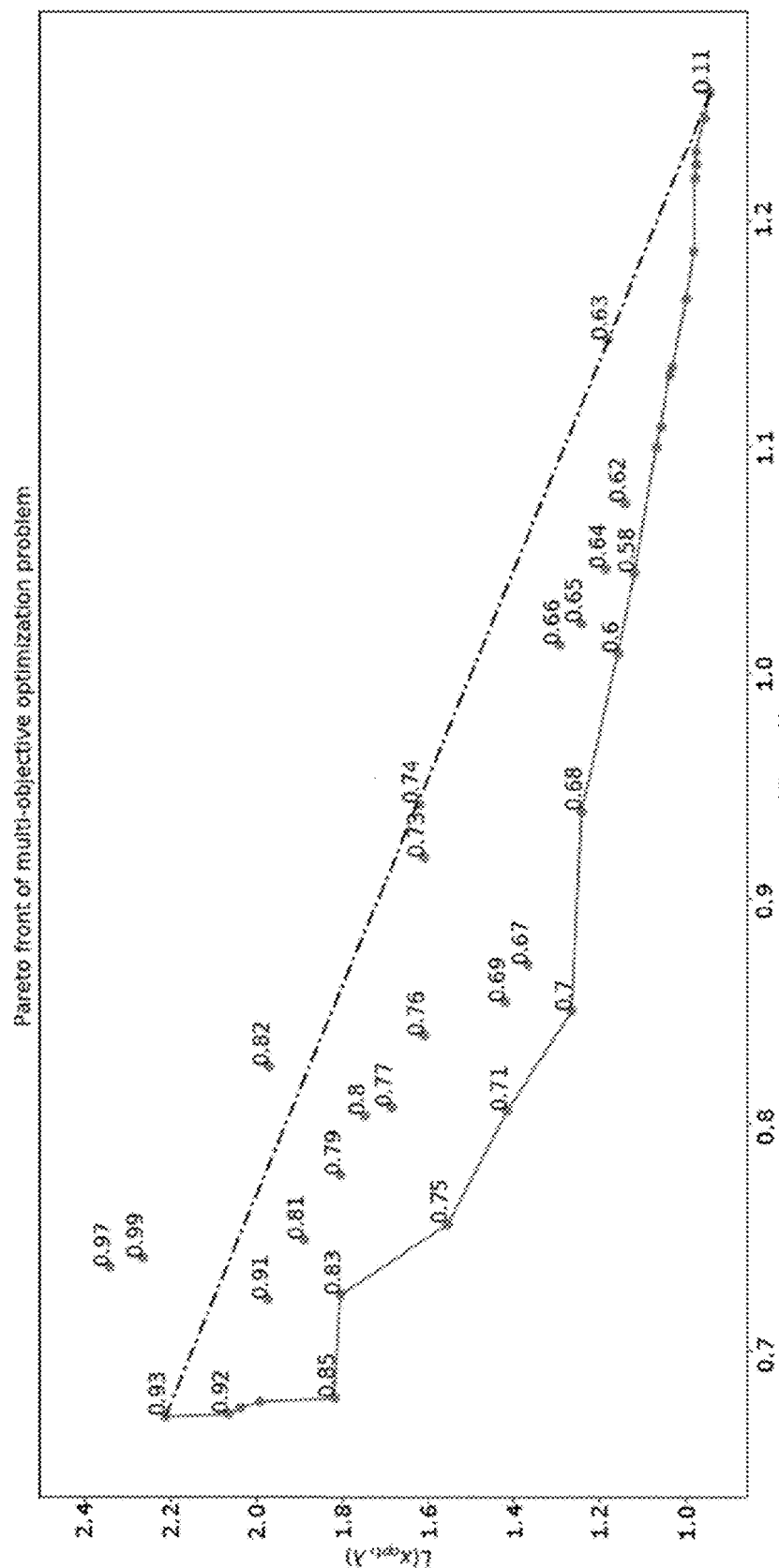
FIG. 3: an example of a Pareto front used in optimisation of the control parameters of the inverter.

In order to find suitable values for the weighting factor, the algorithm described previously is run for varying values of $\lambda$ and V(x) and L(x) from Equation 5, computed with the optimal vertex x are kept in memory. FIG. 3 illustrates an example of a graph drawn to plot the optimal value of L(x) (vertical axis) as a function of the optimal value of V(x) (horizontal axis) for every possible value of A, these values appearing as numbers in the body of the graph.

From this graph, the Pareto Front (illustrated as a zigzag line) is computed where every point on the front dominates any other point that does not lie on the front. Three Pareto optima are automatically selected as follows:

The optimal value of is chosen for full voltage correction and corresponds to the left-most point of the Pareto front (V(x) is plotted on the x axis);

The optimal value of $\lambda$ is chosen for full line loading correction and corresponds to the right most point of the Pareto front (L(x) is plotted on the y axis);

The optimal value of is chosen for an ideal trade-off and corresponds to the 'knee-bend' of the Pareto front, which is in the region of $0.7<\lambda<0.71$.

Mathematically, the last Pareto optimum may be computed through various methods:

For each point on the pareto front, add up the value of V(x) and L(x) and choose the smallest values of x+y. The corresponding $\lambda$ is the ideal trade-off or corresponding 'knee-bend', i.e. $0.7<\lambda<0.71$.

Draw a line from the first Pareto optimum to the second (illustrated as a chain line). The point on the Pareto front furthest from this line in the direction of its normal corresponds to the ideal $\lambda$ for trade-off, in the present case 0.7.

The computation of the Pareto front and the Pareto optimum is automated, given that the user decides which metric of the cost function has the highest priority beforehand.

Once the optimum parameters have been determined, they are then provided to the controller 19 and the inverter 17 is controlled on that basis.

During the optimised operating mode, further measurements may be taken, and the optimisation as described above can be continued on the basis of this new data.

In the case of multiple inverters 17, i.e. a system 1 with multiple local generators 15 feeding onto the same bus 3 at multiple nodes 2a, 2b, 2c, . . . , the optimisation may be carried out at each node 2a, 2b, 2c, . . . , of the system individually, or, ideally, by treating all inverters 17 simultaneously in the case of a communication network such as an Internet link enabling all controllers 19 to communicate.

Subsequently, the optimised parameters are fed to the controller 19, and the inverter 17 is operated on the basis thereof. As a result, the system is operating in an optimised operating mode, and the transfer function of the inverter causes the inverter to convert power at an optimised power factor. The entire optimisation method may be repeated periodically so as to compensate for any changes on the bus 3 (connection/disconnection of any other nodes, change in behaviour of users which affects the power on the bus, and so on).

It should also be noted that the optimisation may be more complex than that described above and may take into account information on variations on the bus over time, e.g. at different times of day, on different days of the week and so on, and may thus adapt the transfer function of the inverter 17 throughout the day in function thereof.

Finally, it should be noted that the method of the invention can be provided as a computer program product containing instructions which cause a controller 19 or a general-purpose computer controlling one or more controllers 19 to carry out the method described above when said instructions are executed. This computer program product can be stored on a non-volatile storage medium such as a hard disc, a CD-ROM, a DVD-ROM, a memory card, or similar.

Although the invention has been described in terms of specific embodiments, variations thereto are possible without departing from the scope of the invention as defined by the appended claims.

The invention claimed is:

1. Method of operating at least one node of a power distribution system comprising a power distribution bus, said node comprising:

at least one local power generator connected to said power distribution bus at a respective connection point via a respective inverter, said inverter having a power factor able to be predetermined by means of a controller and having a voltage/reactive power transfer function determined by said controller on the basis of a plurality of control parameters;

a plurality of sensors arranged to provide timestamped measurements of at least the voltage, active power and reactive power at said connection point;

an emulator adapted to emulate the behaviour of said controller and said inverter so as to output a value of emulated reactive power on the basis of an input value of said voltage, said emulator emulating said transfer function;

a supervised learning model; and an optimiser arranged to output control parameters for said controller and to determine their optimum values;

wherein said method comprises a first training phase in which:

a first training dataset is obtained, comprising timestamped measurements of said voltage, said active power and said reactive power at said connection point obtained at a plurality of time under a predetermined initialisation set of control parameters provided to said controller;

said supervised learning model is trained on the basis of said first training dataset so as to determine a relationship between, on the one hand, measured reactive power and measured active power, and on the other hand, measured voltage at said connection point;

and a second training phase, in which:

a second training dataset is obtained, comprising further measurements of said voltage, said active power and said reactive power at said connection point obtained at a plurality of timestamps under non-optimised control parameters;

said further measurements of voltage are input to said emulator so as to generate an emulated reactive power value on the basis of said predefined control parameters supplied by said optimiser, a sum of said emulated reactive power value and said measurements of reactive power being input as a first input to said supervised learning model, said measured active power being input as a second input to said supervised learning model, this latter outputting, on the basis of its said inputs, a simulated voltage value which is input to said optimiser together with said sum of said modelled reactive power and said measurements of reactive power, said optimiser applying a gradient-free optimisation so as to iteratively determine optimised control parameters;

and wherein, in an optimised operating mode, said optimised control parameters determined in said second training phase are fed to said controller so as to determine the transfer function of said inverter on the basis thereof, and thereby to convert power from said local power generator to AC power at a power factor determined by said controller on the basis of said transfer function and the measured voltage at the connection point.

2. Method according to claim 1, wherein, in said first training phase, said measurements of said voltage, said active power and said reactive power at said connection point are obtained at a plurality of times with the power factor of said inverter set to a value of 1.

3. Method according claim 1, wherein, in said first training phase, said measurements of measurements of said voltage, said active power and said reactive power at said connection point are obtained at a plurality of times with said transfer function of said inverter set arbitrarily.

4. Method according to claim 1, wherein said optimiser applies a Nelder-Mead method, or a Cobyla optimisation, or a genetic algorithm, or a particle swarm optimisation, or a Powell optimisation.

5. Method according to claim 1, wherein said optimised control parameters are determined for a plurality of said inverters simultaneously.

6. Method according to claim 1, wherein further measurements are taken during said optimised operating mode and are used to further optimise said optimised control parameters.

7. Method according to claim 1, wherein said optimised control parameters are determined in said second training phase by minimising a cost function, said cost function being:

$$\min C(x, \lambda) = \frac{\lambda V^2(x) + (1-\lambda)L^2(x)}{V(x) + L(x)}$$

where x is a value evaluated during the optimization process, and $\lambda$ is a weighting factor between 0 and 1, V is defined as:

$$V(x) = \sum_{n=1}^{N} \sqrt{\frac{1}{K}\sum_{k=1}^{K}(10u_{k,n}(x) - 10)^2}$$

and L is defined as:

$$L(x) = \sum_{n=1}^{N} \frac{\sqrt{\frac{1}{K}\sum_{k=1}^{K} Q_{k,n}(x)^2}}{(\max Q_n - \min Q_n)}$$

where K is the number timestamps of said second training dataset, N is the total number of inverters, u is the predicted voltage provided by said supervised learning model and Q is the sum of the reactive powers from the measurements of reactive power and emulated reactive power, k denotes the timestamp of the measurement and n denotes the inverter in question.

8. Method according to claim 7, wherein said optimisation is carried out for a plurality of values of $\lambda$, optimal values of V(x) and L(x) are recorded and a Pareto front is calculated, said optimum parameter values being selected on the basis of said Pareto front.

9. Power distribution system comprising a local distribution bus extending from a substation and at least one node, said node comprising
- a connection point with said bus;
- optionally, a local power consumer connected to said connection point;
- a plurality of sensors adapted to measure voltage, active power flow and reactive power flow at said connection point;
- a local power generator connected via an inverter to said connection point, said inverter being adapted to carry out Volt/VAr control under the control of a controller adapted to carry out the method of claim 1.

\* \* \* \* \*